US011952643B2

(12) United States Patent
Scheunis et al.

(10) Patent No.: US 11,952,643 B2
(45) Date of Patent: Apr. 9, 2024

(54) PROCESS FOR THE RECOVERY OF LITHIUM

(71) Applicant: UMICORE, Brussels (BE)

(72) Inventors: Lennart Scheunis, Olen (BE); Willem Callebaut, Hoboken (BE)

(73) Assignee: Umicore, Brussels (BE)

( * ) Notice: Subject to any disclaimer, the term of this patent is extended or adjusted under 35 U.S.C. 154(b) by 238 days.

(21) Appl. No.: 17/295,076

(22) PCT Filed: Oct. 31, 2019

(86) PCT No.: PCT/EP2019/079762
§ 371 (c)(1),
(2) Date: May 19, 2021

(87) PCT Pub. No.: WO2020/104164
PCT Pub. Date: May 28, 2020

(65) Prior Publication Data
US 2022/0017990 A1     Jan. 20, 2022

(30) Foreign Application Priority Data

Nov. 23, 2018 (EP) .................................. 18207942

(51) Int. Cl.
   *C22B 26/12*       (2006.01)
   *C22B 5/12*        (2006.01)
   *C22B 7/00*        (2006.01)
   *H01M 10/54*      (2006.01)

(52) U.S. Cl.
CPC ............... *C22B 26/12* (2013.01); *C22B 5/12* (2013.01); *C22B 7/002* (2013.01); *H01M 10/54* (2013.01)

(58) Field of Classification Search
CPC ........... C22B 25/12; C22B 5/12; C22B 7/002; H01M 10/54
USPC .......................................................... 75/59
See application file for complete search history.

(56) References Cited

U.S. PATENT DOCUMENTS

| 2,561,439 | A | | 7/1951 | Erasmus |
| 2,627,452 | A | | 2/1953 | Cunnungham |
| 4,131,988 | A | | 1/1979 | Finegold |
| 7,169,206 | B2 | † | 1/2007 | Cheret |
| 2012/0240729 | A1 | † | 9/2012 | Verscheure |
| 2017/0022068 | A1 | | 1/2017 | Rodriguez et al. |
| 2018/0309174 | A1 | | 10/2018 | Rodriguez et al. |
| 2020/0325557 | A1 | | 10/2020 | Rodriguez et al. |

FOREIGN PATENT DOCUMENTS

| AR | 095821 | A1 | | 11/2015 |
| AR | 102820 | A1 | | 3/2017 |
| AR | 112350 | A1 | | 10/2019 |
| CN | 103086405 | B | | 12/2013 |
| CN | 103526035 | A | | 1/2014 |
| CN | 105154659 | A | † | 12/2015 |
| CN | 106848469 | A | | 6/2017 |
| CN | 105154659 | B | | 10/2017 |
| CN | 107964593 | | † | 11/2017 |
| CN | 107964593 | | † | 4/2018 |
| CN | 107964593 | A | † | 4/2018 |
| EP | 0250342 | A1 | † | 12/1987 |
| WO | 2011035915 | A1 | | 3/2011 |
| WO | 2017121663 | A1 | | 7/2017 |

OTHER PUBLICATIONS

KIPO; Office Action for Korean Patent Application No. 10-2021-7019547 dated Oct. 24, 2022, 13 pages.
ISA/EP; International Search Report and Written Opinion for International Patent Application No. PCT/EP2019/079762 dated Jan. 28, 2020, 9 pages.
Verhaeghe, F., et al., "Valorisation of battery recycling slags", Second International Slag Valorisation Symposium: The Transition to Sustainable Materials Management, Apr. 28, 2011, accessed at: http://www.slag-valorisation-symposium.eu/2011/images/presentations/s4_12_pres_verhaeghe.pdf, 31 pages.
Dang, Hui, et al., "Recycled Lithium from Simulated Pyrometallurgical Slag by Chlorination Roasting", ACS Sustainable Chemistry & Engineering, 2018, pp. 13160-13167, vol. 6.

† cited by third party

*Primary Examiner* — Melissa S Swain
(74) *Attorney, Agent, or Firm* — NK Patent Law

(57) ABSTRACT

The present disclosure concerns a process for the concentration of lithium in metallurgical fumes. The process comprises the steps of: —providing a metallurgical molten bath furnace; —preparing a metallurgical charge comprising lithium-bearing material, transition metals, and fluxing agents; —smelting the metallurgical charge and fluxing agents in reducing conditions in said furnace, thereby obtaining a molten bath with an alloy and a slag phase; and, —optionally separating the alloy and the slag phase; characterized in that a major part of the lithium is fumed as LiCl from the molten slag, by addition of alkali or earth alkali chloride to the process. Using a single smelting step, valuable transition metals such as cobalt and nickel also present in the charge are collected in an alloy phase, while the lithium reports to the fumes. The lithium in the fumes is available in concentrated form, suitable for subsequent hydrometallurgical processing.

7 Claims, No Drawings

PROCESS FOR THE RECOVERY OF LITHIUM

CROSS-REFERENCE TO RELATED APPLICATIONS

This application is a U.S. National Stage application of International Patent Application No. PCT/EP2019/079762, filed on Oct. 31, 2019, which claims the benefit of European Patent Application No. 18207942.6, filed on Nov. 23, 2018.

The present disclosure concerns a process for the concentration of lithium in metallurgical fumes. The lithium can then be recovered from these fumes according to known hydrometallurgical principles.

The world consumption of lithium has more than doubled in the past decade. This increase is mainly due to its use in rechargeable lithium-ion batteries. Lithium-ion batteries have indeed become the preferred source of electrical energy whenever high energy or high power is desired in applications where weigh or volume are at a premium. This growth will likely continue in the next years: the global capacity of lithium-ion batteries that will hit the market each year is expected to reach hundreds of gigawatt-hours by the late 2020's.

Different types of battery chemistries are in use, all of them based on the oxidation and reduction of lithium. Widely used cathode compounds include lithium cobalt oxide (LCO), lithium manganese oxide (LMO), lithium nickel manganese cobalt oxide (NMC), lithium iron phosphate (LFP), and lithium nickel cobalt aluminum oxide (NCA). At anode, lithium-graphite intercalation compounds are typical, with lithium metal or lithium titanate (LTO) also being developed. Lithium is furthermore used in the electrolyte in the form of $LiPF_6$. The current lithium consumption in lithium-ion batteries accounts for about half of total lithium production.

Lithium is also used in other products such as lithium primary batteries, as well as in lithium-bearing glasses, ceramics, polymers, casting powders, alloys, greases, and pharmaceuticals.

From the above, it clearly appears that massive quantities of lithium will become available in all kinds of production scrap and in end-of-life goods. Recovery of that lithium may offer interesting industrial perspectives if efficient processes are developed.

Up till now, the recycling of lithium from non-battery related materials has been fairly limited to the reworking of certain production scraps of the production process, like in the glass and ceramics industry. It is therefore expected that the future emphasis will lie with the recovery of lithium from lithium-ion batteries.

Lithium-ion batteries involve complex compounds often comprising particularly valuable metals such as nickel and cobalt. The research in the field of battery recycling has therefore been focusing on the recovery of these metals rather than on lithium. The literature describes several hydrometallurgical processes that use a variety of extraction and purification steps to recover nickel and cobalt from powders derived from lithium-ion battery waste. Lithium typically ends up diluted in the residual liquor of the last hydrometallurgical step. Often, this stream goes directly to the waste water treatment plant without any attempt to recover the lithium. In rare cases, lithium is nevertheless recovered by precipitation; this step generally offers only a low recovery yield, unless it is combined with an energy-intensive crystallization and evaporation step.

As an alternative to a fully hydrometallurgical process, one could opt for a hybrid process comprising a pyrometallurgical first step. Pyrometallurgy has the notorious advantage of being robust and flexible with respect to the composition of the feed, from which specific elements can readily be concentrated in one of the metallurgical phases. Hence, from a lithium recycling perspective, a wide variety of lithium-containing scraps can be envisaged, including primary batteries, rechargeable batteries, glasses, ceramics, polymers, and casting powders.

In the context of lithium-ion battery recycling, the recovery of lithium via pyrometallurgy has been described in "Valorisation of battery recycling slags" (Proceedings of the second international slag valorization symposium, pages 365-373, Apr. 20, 2011). Lithium is one of the most easily oxidized elements and is said to report to the slag. Subsequently, a hydrometallurgical process is described to recover the lithium from the slag. This is however a complex undertaking due to the dilution of the lithium in the slag, leading to diluted liquors containing marginally exploitable levels of lithium.

The present invention solves this dilution problem by concentrating the lithium in the fumes of a smelting operation instead of in the slag. These fumes are formed in much smaller amounts compared to slag, thus offering a more interesting starting product for a hydrometallurgical process. The concentrated lithium fumes are moreover easily leachable, thereby facilitating the purification steps. This result is achieved by the addition of a suitable source of chlorides to the smelting furnace.

It should be noted that the formation and fuming of lithium as LiCl, using $CaCl_2$) as a source of chlorides, has been described in the context of the lithium recovery from spodumene. A process has indeed been described wherein finely comminuted spodumene is mixed with powdered $CaCl_2$), the mixture being then subjected to high temperature roasting in the solid phase.

Such a chlorination-roasting process is disclosed in U.S. Pat. Nos. 2,561,439 and 2,627,452.

U.S. Pat. No. 2,561,439 teaches a vacuum chlorination-roasting process of comminuted spodumene pelletized with $CaCl_2$). LiCl evolves, which is condensed and recovered.

U.S. Pat. No. 2,627,452 teaches a preliminary thermal conversion of alfa to beta spodumene, followed by addition of $CaCl_2$), and by a second heat treatment in a rotary kiln, wherein LiCl is formed and volatilized.

This chlorination-roasting process has also been applied to a lithium-bearing slag obtained from reducing smelting processes for the recovery of metals from spent lithium batteries. This is shown in CN 107964593 A, wherein the solidified lithium-bearing slag is first crushed and then mixed with a metal chloride such as $CaCl_2$). Subsequently, the mixture is roasted, and the evolving LiCl captured. Such a multi-step process comprising the production of the slag via smelting, the solidification of the slag, its comminution, mixing it with fine $CaCl_2$), roasting of the mixture and capturing the LiCl is however both expensive and energy intensive.

In the present process however, good use is made of the fact that liquid phases are obtained during smelting, allowing for the combined recovery of valuable metals such as iron, copper, cobalt, and nickel in an alloy phase, and of lithium in the fumes, in a single operation. Compared to the above mentioned prior-art, the present process has a significant efficiency advantage since the slag does not need to be separated, mixed with a chloride source, and then re-heated to perform the LiCl fuming.

To this end, a process for the concentration of lithium in metallurgical fumes is described, comprising the steps of:
providing a metallurgical molten bath furnace;
preparing a metallurgical charge comprising lithium-bearing material, transition metals, and fluxing agents;
smelting the metallurgical charge and fluxing agents in reducing conditions in said furnace, thereby obtaining a molten bath with an alloy and slag phase; and,
optionally separating the alloy and the slag phase;
characterized in that a major part of the lithium is fumed as LiCl from the molten slag, by addition of alkali or earth alkali chloride to the process.

The addition of chlorides leading to the fuming of LiCl can be performed on the molten slag, after it has been separated from the alloy such as by tapping.

By major part of the lithium is meant at least 50% by weight of the lithium entering the process. By "addition of alkali or earth alkali chloride" is meant that also a mixture of alkali and earth alkali chloride can be added.

In this process, the transition metals of most interest are iron, copper, nickel, and cobalt.

In a preferred embodiment, the alkali or alkaline earth chloride may be fed to the furnace as part of the metallurgical charge, as part of the fluxing agents, or added separately to the liquid slag during or after smelting.

The stoichiometry of the chloride is determined according to the reactions:

$$Li_2O + CaCl_2 \rightarrow LiCl + CaO \quad (1)$$

$$Li_2O + MgCl_2 \rightarrow LiCl + MgO \quad (2)$$

in the case of $CaCl_2$ or $MgCl_2$ respectively.

A super-stoichiometric amount of chloride helps in having these reactions proceed to completion. The amount of chlorides that is added should preferably be at least stoichiometric with respect to lithium in the fumes. More preferably, a stoichiometric excess of more than 10% is used.

When very high yields are desired, the amount of chlorides that is added should preferably be at least stoichiometric with respect to lithium in the slag. More preferably, a stoichiometric excess of more than 10% is used. This, combined with the use of $CaCl_2$), will ensure a lithium fuming yield of more than 80%, or even of more than 90%.

The preferred chloride sources are $MgCl_2$, more preferably $CaCl_2$). These chlorides have a high boiling point of respectively 1412° C. and 1935° C. at normal pressure, guaranteeing a good availability of these chlorides to react with the oxidized lithium in the slag at the operating temperature of the smelting furnace.

The process is particularly suitable for concentrating lithium present in materials also containing nickel and/or cobalt. A $pO_2$ is then maintained that is sufficiently low to reduce a major part of at least one of nickel and cobalt to the metallic state, allowing these elements to report to the alloy phase. By major part is meant at least 50% by weight of the metals entering the process.

The skilled person knows how to vary the redox potential by adjusting the ratio between oxidizing agents such as air or $O_2$ and reducing agents. Typical reducing agents are natural gas or coal, but could also be metallic fractions like aluminum, elemental carbon, and plastics present in the metallurgical charge. The redox potential can be determined by monitoring the yield of the metals such as nickel and cobalt to the alloy.

Lithium, which oxidizes easily, is assumed to quantitatively report to the slag. It will then react with the added chlorides, forming LiCl, which evaporates as fumes.

The process is thus specially adapted for treating lithium-bearing materials comprising lithium batteries, their scrap, or their production waste.

The LiCl that reports to the fumes can be separated and collected from the flue gas by using common unit operations, like scrubbers, baghouse filters, electro-static precipitators and cyclones.

EXAMPLES

End of life batteries with a composition according Table 1 are shredded to allow easier manipulation and dosing.

A molten bath is then prepared in an alumina crucible of 2 L where 400 g of a starting slag is heated and melted in an induction furnace at a temperature of 1500° C. This starting slag is the result of a previous operation and is used to provide a liquid bath to which the batteries can be added. The composition of the slag is given in Table 2.

Once the slag is melted, the batteries are added together with limestone and sand fluxes. The additions are made gradually over a period of 2 hours. During this time, $O_2$ is blown at a rate of 160 L/hour above the bath to combust the metallic Al and carbon present in the batteries.

After the final addition of battery scrap, CO is blown through the bath at a rate of 60 L/hour for 30 minutes to obtain a homogenous bath and fix the final reduction level. Samples of alloy and slag are taken. The mass balance of slag and alloy is shown in Table 2. The yields are calculated based on the alloy and slag phases only, thus discarding (minor) losses or carry-over to the gas phase.

TABLE 1

Composition of the batteries

|  | Al | Co | Cu | Ni | Li |
|---|---|---|---|---|---|
| Batteries (wt. %) | 7 | 16 | 9 | 2.5 | 2.5 |

TABLE 2

Detailed material balance of the smelting operation before chloride addition

| Input | Mass (g) | Al (wt. %) | Si (wt. %) | Ca (wt. %) | Co (wt. %) | Cu (wt. %) | Ni (wt. %) | Li (wt. %) |
|---|---|---|---|---|---|---|---|---|
| Starting slag | 400 | 20 | 13 | 19 | 0.2 | — | 0.1 | 3.8 |
| Batteries | 1000 | 7 | — | — | 16 | 9 | 2.5 | 2.0 |
| Limestone | 300 | — | 2.2 | 38.0 | — | — | — | — |
| Sand | 100 | — | 46.7 | — | — | — | — | — |

TABLE 2-continued

Detailed material balance of the smelting operation before chloride addition

| Output | Mass (g) | Si (wt. %) | Ca (wt. %) | Co (wt. %) | Cu (wt. %) | Ni (wt. %) | Li (wt. %) | Al (wt. %) |
|---|---|---|---|---|---|---|---|---|
| Alloy | 270 | 0.0 | 0.0 | 58.1 | 33.1 | 8.8 | 0.0 | 0.0 |
| Slag | 950 | 11.0 | 19.9 | 0.5 | 0.1 | 0.1 | 3.8 | 15.7 |

| Yield | Mass (g) | Si (%) | Ca (%) | Co (%) | Cu (%) | Ni (%) | Li (%) | Al (%) |
|---|---|---|---|---|---|---|---|---|
| Alloy | 22 | 0.0 | 0.0 | 97.2 | 99.0 | 94.6 | 0.0 | 0.0 |
| Slag | 78 | 100.0 | 100.0 | 2.8 | 1.0 | 5.4 | 100.0 | 100.0 |

While still at 1500° C., argon is blown at a rate of 60 L/hour through the liquid bath to ensure mixing of the slag. From this experiment, it is clear that without the addition of chlorides, the Li remains in the slag.

Starting each time from the lithium-bearing slag according to above Table 2, 4 different experiments were performed, differing only in the total amount of $CaCl_2$ added. These 4 amounts represent 0%, 60%, 100% and 120% of the chloride needed for stoichiometric reaction with the Li present in the slag. $CaCl_2$) is added gradually during the first hours in 12 equal additions every 5 minutes. Prior to the test the $CaCl_2$) is dried at a temperature of 150° C. in order to remove any water excess. The slag is allowed to react for an additional 30 minutes after the last $CaCl_2$) addition, while still continuing the gas blowing with Ar.

Samples of the slag are taken before the $CaCl_2$) addition, after the final addition, and 30 minutes after the last addition. The results are shown in Table 3, together with the overall yield of the Li to the fumes.

For a sub-stoichiometric addition of 60%, all the $CaCl_2$) reacts with the Li in the slag to form volatile LiCl. A 100% stoichiometric amount of $CaCl_2$ is however not sufficient to vaporize the lithium quantitatively. A super-stoichiometric amount of 120%, equivalent to a 20% excess, achieves a lithium yield of 96%.

Samples of the fumes all show a lithium concentration of 15%, which corresponds to a LiCl content of more than 90%. The remainder is primarily $CaCl_2$) present due to mechanical carry over.

TABLE 3

Li content of the slag in function of time and stoichiometry ($CaCl_2$)

| | Li content in slag | | | |
|---|---|---|---|---|
| $CaCl_2$ Stoichiometry | Before addition | After final addition | 30 min after final addition | Li yield to fumes |
| 0% | 3.8 | 3.8 | 3.7 | 3% |
| 60% | 3.8 | 1.8 | 1.5 | 60% |
| 100% | 3.8 | 1.3 | 0.78 | 79% |
| 120% | 3.8 | 1.5 | 0.17 | 96% |

Similarly to the 4 experiments with $CaCl_2$), 2 experiments were performed using $MgCl_2$. The results are shown in Table 4. The lithium yields are markedly lower, though still satisfactory, in particular when using a 200% stoichiometry.

TABLE 4

Li content of the slag in function of time and stoichiometry ($MgCl_2$)

| | Li content in slag | | | |
|---|---|---|---|---|
| $MgCl_2$ Stoichiometry | Before addition | After final addition | 30 min after final addition | Li yield to fumes |
| 100% | 3.8 | 2.2 | 1.9 | 51% |
| 200% | 3.8 | 1.0 | 0.8 | 78% |

NaCl was also tested as chlorinating agent, resulting in a yield of 26% when using a 100% stoichiometry. A super-stoichiometric addition of 250% NaCl result in satisfactory yields of 50% or more. This is shown in Table 5.

TABLE 5

Li content of the slag in function of time and stoichiometry (NaCl)

| | Li content in slag | | | |
|---|---|---|---|---|
| NaCl Stoichiometry | Before addition | After final addition | 30 min after final addition | Li yield to fumes |
| 100% | 3.8 | 3.0 | 2.8 | 26% |
| 250% | 3.8 | 2.1 | 1.8 | 53% |

The invention claimed is:

1. A process for concentrating lithium in metallurgical fumes comprises:
    providing a metallurgical molten bath furnace;
    preparing a metallurgical charge comprising lithium-bearing material, transition metals, and fluxing agents;
    smelting the metallurgical charge and fluxing agents in reducing conditions in said furnace, thereby obtaining a molten bath with an alloy phase and a slag phase; and, optionally separating the alloy phase and the slag phase;
    wherein a major part of the lithium is fumed as LiCl from the slag phase of the molten bath, by addition of alkali and/or alkaline earth chloride to the process.

2. The process according to claim 1, wherein the alkali and/or alkaline earth chloride is added to the process as part of the metallurgical charge, as part of the fluxing agents, or to the slag phase of the molten bath during or after smelting.

3. The process according to claim 1, wherein the alkali and/or alkaline earth chloride is added in an amount corresponding to a stoichiometric excess with respect to the Li in the fumes.

4. The process according to claim 3, wherein the stoichiometric excess of alkali and/or alkaline earth chloride amounts to at least 10%.

5. The process according to claim 1, wherein the alkali and/or alkaline earth chloride comprises $CaCl_2$.

6. The process according to claim 1, wherein the lithium-bearing material also contains nickel and/or cobalt, and wherein a $pO_2$ is maintained that is sufficiently low to reduce a part of at least one of nickel and cobalt to the alloy phase of the molten bath.

7. The process according to claim 6, wherein the lithium-bearing material comprises Li batteries, their scrap, or their production waste.

* * * * *